United States Patent
Maturana et al.

(10) Patent No.: US 12,327,118 B2
(45) Date of Patent: Jun. 10, 2025

(54) INDUSTRIAL INTERNET OF THINGS AIOPS WORKFLOWS

(71) Applicant: Rockwell Automation Technologies, Inc., Mayfield Heights, OH (US)

(72) Inventors: Francisco Maturana, Lyndhurst, OH (US); Jay W. Schiele, Union Grove, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 976 days.

(21) Appl. No.: 17/230,115

(22) Filed: Apr. 14, 2021

(65) Prior Publication Data
US 2022/0334838 A1  Oct. 20, 2022

(51) Int. Cl.
*G06N 20/00* (2019.01)
*G06F 9/30* (2018.01)
*G06F 18/214* (2023.01)

(52) U.S. Cl.
CPC ........ *G06F 9/3017* (2013.01); *G06F 9/30123* (2013.01); *G06F 18/2148* (2023.01); *G06N 20/00* (2019.01)

(58) Field of Classification Search
CPC .................................................... G06N 20/00
See application file for complete search history.

(56) References Cited

U.S. PATENT DOCUMENTS

| | | | | |
|---|---|---|---|---|
| 10,984,338 B2* | 4/2021 | Morris, II | ............. | G06N 20/00 |
| 2018/0357334 A1* | 12/2018 | Chao | ....................... | G06F 16/10 |
| 2019/0197354 A1 | 6/2019 | Law et al. | | |
| 2020/0151619 A1* | 5/2020 | Mopur | .................... | H04L 67/12 |
| 2020/0327371 A1* | 10/2020 | Sharma | .................... | G06N 3/08 |

OTHER PUBLICATIONS

Cook et al ("Anomaly Detection for IoT Time-Series Data: A Survey" 2020) (Year: 2020).*
Qian et al ("Orchestrating the Development Lifecycle of Machine Learning-based IoT Applications: A Taxonomy and Survey" 2020) (Year: 2020).*
Communication pursuant to Article 94(3) EPC issued by the European Patent Office dated May 30, 2023 in EP Application No. 22167590.3, 6 pages.
Extended European Search Report for EP Application No. 22167590.3, mailed Aug. 22, 2022; 16 pages.

* cited by examiner

*Primary Examiner* — Lut Wong

(57) ABSTRACT

Data flows and data processing modules are provided to fulfill the implementation of: contextualized data collection, scalable analytics, and machine learning operations quality assurance. These modules may be implemented as stand-alone components, and/or bundled as a group of coordinated microservices. The conversion of raw domain expertise and knowledge into data processors, analytics, and visualization modules for industry oriented Industrial Internet of Things (IIoT) solutions is streamlined.

20 Claims, 9 Drawing Sheets

DEPLOY A MODULE THAT COLLECTS RUNTIME DATA AND TRANSMITS RUNTIME DATA IN ASSOCIATION WITH A CONTEXT ASSOCIATED TO THE RUNTIME DATA
702

BASED ON THE RUNTIME DATA AND THE CONTEXT ASSOCIATED WITH THE RUNTIME DATA, DEVELOPING AT LEAST ONE MACHINE LEARNING MODEL
704

BASED ON FURTHER RUNTIME DATA AND AT LEAST ONE OUTPUT OF THE AT LEAST ONE MACHINE LEARNING MODEL, GENERATING AN ALERT ABOUT THE AT LEAST ONE MACHINE LEARNING MODEL
706

*FIG. 7*

INDUSTRIAL INTERNET OF THINGS AIOPS WORKFLOWS

BACKGROUND

Industrial automation needs adds tiers of complexity to applications with strict definitions and workflows to attain repeatability, reliability, scalability, and security. Interconnected sensors, instruments, and other devices networked together with computers for industrial applications, (such as manufacturing and energy management) allows for data collection, exchange, and analysis, that may facilitate improvements in productivity and efficiency as well as other economic benefits.

Applying internet of things (IoT) concepts in industrial sectors and applications may be referred to as industrial internet of things (IIoT). IIoT may include machine-to-machine (M2M) communication, big data, and machine learning. Industrial applications of IIoT include robotics, medical devices, and software-defined production processes. It should be understood that IIoT goes beyond normal consumer devices and internetworking of physical devices usually associated with IoT. IIoT may include information technology (IT) and operational technology (OT). OT refers to the networking of operational processes and industrial control systems (ICSs). This may include, for example, human machine interfaces (HMIs), supervisory control and data acquisition (SCADA) systems, distributed control systems (DCSs), and programmable logic controllers (PLCs).

BRIEF DESCRIPTION OF THE DRAWINGS

FIG. 7 is a flowchart illustrating a method of ensuring machine learning model quality.

DETAILED DESCRIPTION OF THE EMBODIMENTS

In an embodiment, data flows and data processing modules are provided to fulfill the implementation of: contextualized data collection, scalable analytics, and machine learning operations quality assurance. These modules may be implemented as standalone components, and/or bundled as a group of coordinated microservices. The conversion of raw domain expertise and knowledge into data processors, analytics, and visualization modules for industry oriented IIoT solutions is streamlined.

Figure 1:
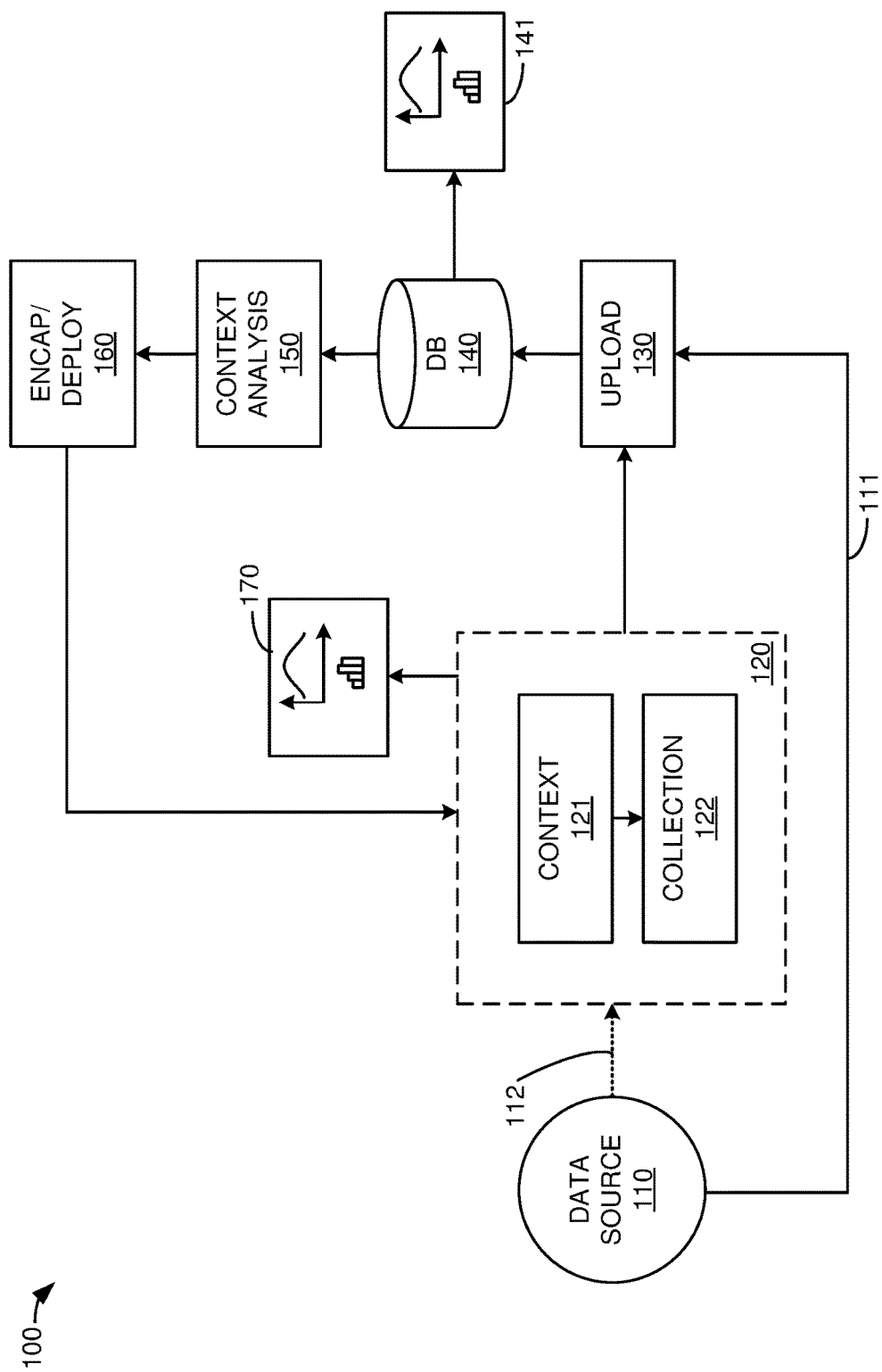
FIG. 1 is a diagram illustrating data flows for associating context.

FIG. 1 is a diagram illustrating data flows for associating context. In FIG. 1, system 100 comprises data source 110, initial data 111, runtime data 112, application 120, upload process 130, database 140, business intelligence output 141, context analysis 150, encapsulation/deployment 160, and display information 170. Application 120 includes context 121 and data collection 122 functions.

In FIG. 1, data source 110 is operatively coupled to application 120 and upload process 130. Application 120 is operatively coupled to upload process 130. Upload process 130 is operatively coupled to database 140. Database 140 is operatively coupled to business intelligence output 141 and context analysis 150. Context analysis 150 is operatively coupled to encapsulation and encapsulation/deployment 160. Encapsulation/deployment 160 is operatively coupled to application 120.

The process of implementing a system that collects contextualized data begins with a data source 110. Data source 110 may be any data source relevant to the manufacturing process that is to have artificial intelligence and/or machine learning applied to it. Data source 110 may be, for example, but is not limited to: automation computers, programmable logic controllers (PLCs), supplier/parts database, personnel records, environmental data (e.g., temperature, pressure, etc.), worker/operator information, etc.

A batch (i.e., initial data 111) of uncontextualized data is uploaded to database 140 using upload process 130. Upload process 130 may be based on, for example, file-transfer protocol (ftp), hypertext transfer protocol (http), transmission control protocol (tcp), user datagram protocol (udp), etc. Database 140 stores the initial batch of uploaded data.

Database 140 is accessed by context analysis 150. Context analysis 150 may comprise building systems/software to extract, transform, and load initial data 111.

Initial data 111 may include historical information or a stream of real-time data from many different systems. This information may be scattered across different software and be structured in various formats. Extraction entails defining the required data sources and implementing methods for gathering data from them.

When a process is implemented to gather the data, it may be placed in a temporary storage area of database 140. While placed in this temporary area, the data may be formatted in accordance with defined standards and models. The final process is loading the structured and formatted data into a more permanent and structured area of database 140.

Context analysis 150 may also develop applications 120 to aid in the collection of runtime data 112. These applications 120 may be deployed to, for example, a factory floor by encapsulation/deployment 160. These applications 120 may be deployed by, for example, using manifest driven deployment processes. It should be understood that encapsulation/deployment 160 may deploy many instances of application 120 and/or many different applications. However, for the sake of clarity and brevity, FIGS. 1-3 illustrate a single application.

Application 120 collects runtime data 112 using a collection 122 process and associates it with a context 121. Application 120 also uploads the collected and associated runtime data using upload process 130. Application 120 may also display information 170 such as baseline trending, etc. Once contextualized runtime data 112 is stored in database 140 by application 120, business intelligence output 141 information may be extracted and/or displayed.

Figure 2:
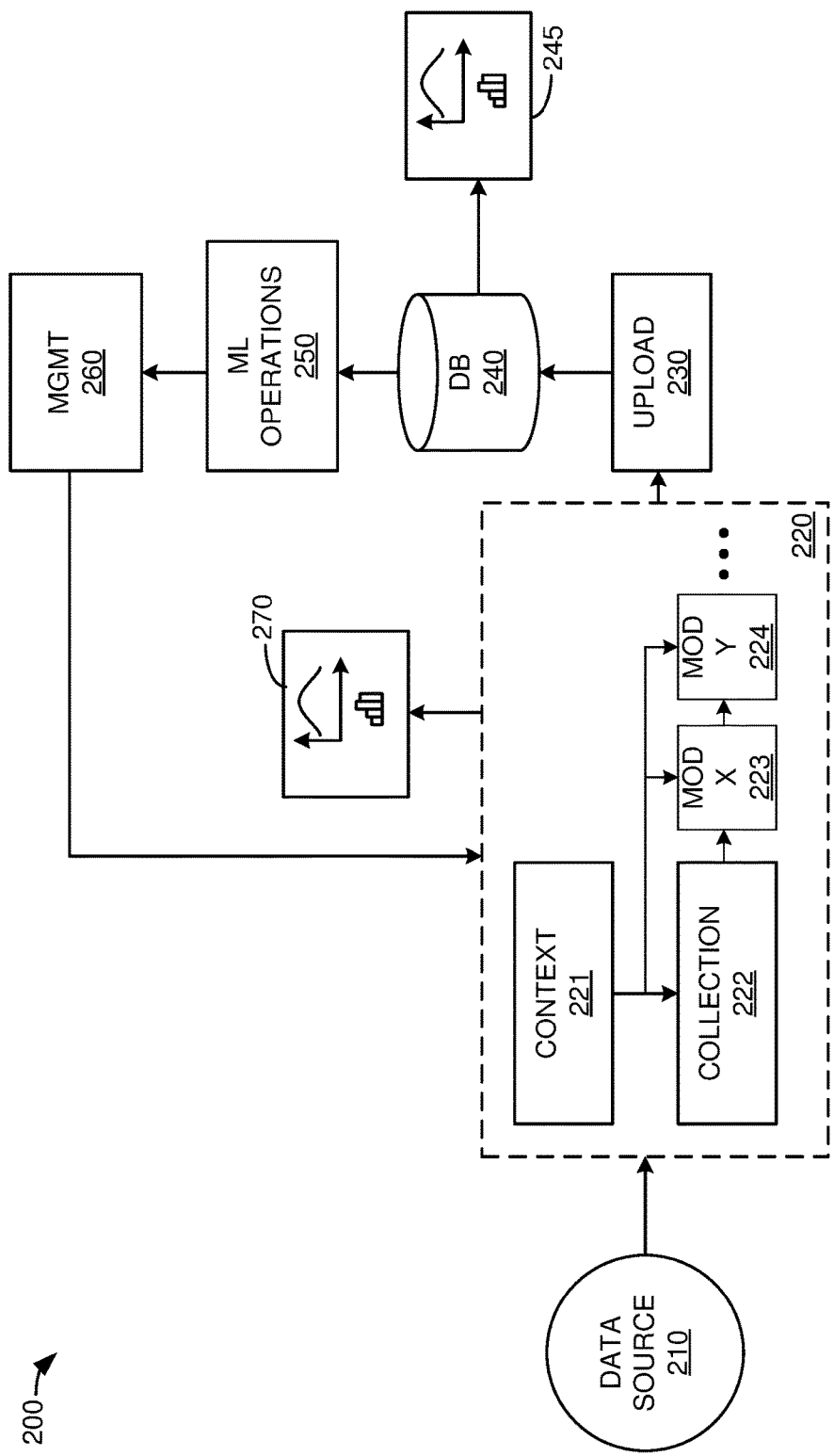
FIG. 2 is a diagram illustrating data flows for deploying machine learning functions.
Figure 3:
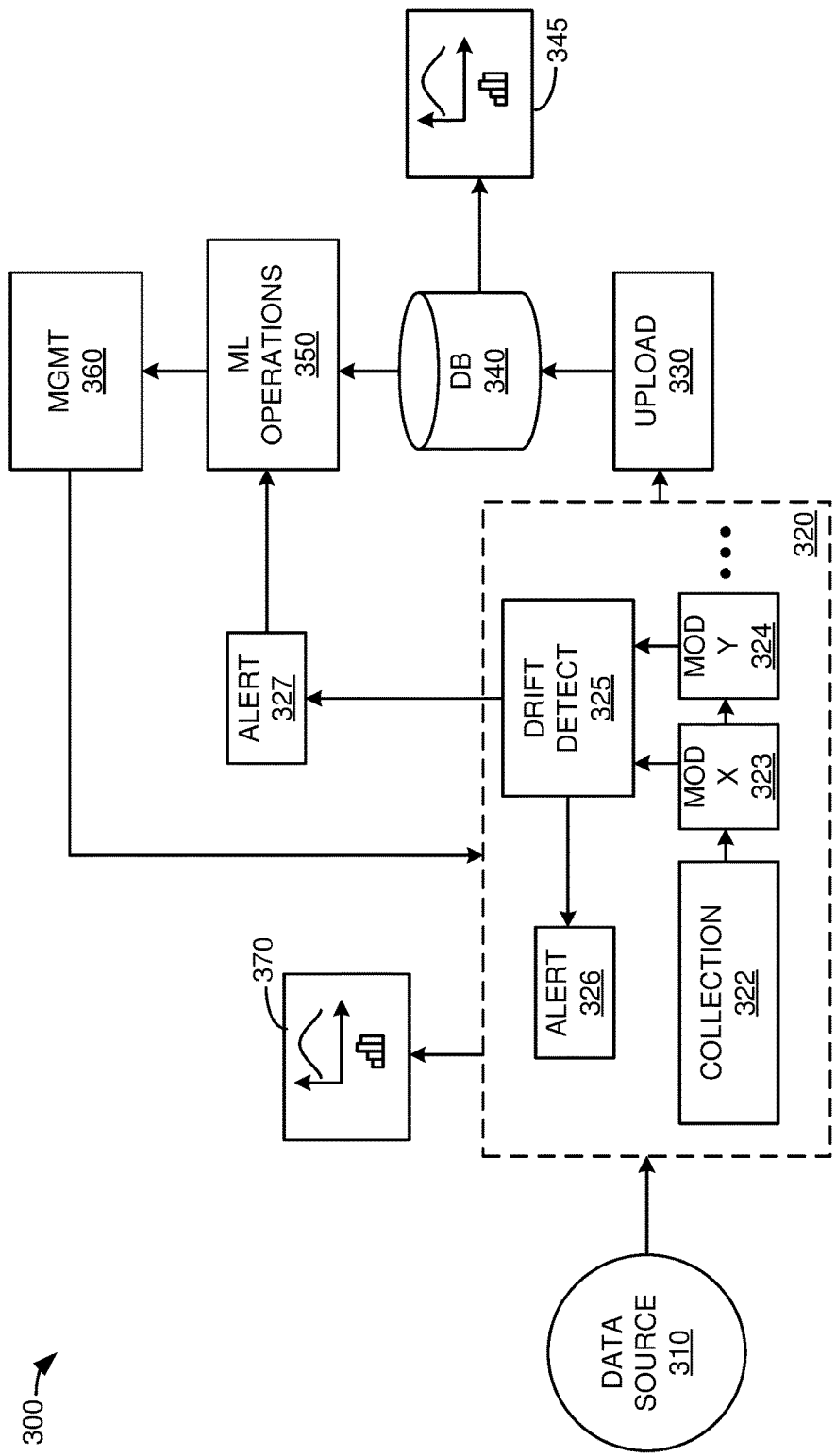
FIG. 3 is a diagram illustrating data flows to maintain machine learning functions.

FIG. 2 is a diagram illustrating data flows for deploying machine learning functions. In FIG. 2, system 200 comprises data source 210, application 220, upload process 230, database 240, business intelligence output 245, machine learning operations 250, machine learning management 260, and information display 270. Application 220 includes context 221, data collection 122, machine learning module/function X 223, and machine learning module/function Y 224.

In FIG. 2, data source 210 is operatively coupled to application 120. Application 220 is operatively coupled to upload process 230. Upload process 230 is operatively coupled to database 240. Database 240 is operatively coupled to business intelligence output 245 and machine learning operations 250. Machine learning operations 250 is operatively coupled to machine learning management 260. Machine learning management 260 is operatively coupled to application 220.

Database 240 is accessed by machine learning operations 250. Database 240 includes collected and contextualized data (e.g., data collected by application 120 and/or application 220.) Machine learning operations 250 develops machine learning modules 223-224 based on the data in database 240.

Machine learning management 260 receives machine learning modules 223-224 and deploys application 220 that implements machine learning modules 223-224. Machine learning modules 223-224 may implement reductive, reactive, predictive, etc. machine learning functions.

Application 220 receives runtime data from data source 210. Application 220 collects 222 and applies a context 221 to the received runtime data from data source 210. Application 220 also provides the context 221 and runtime data to machine learning modules 223-224. The contextualized data and the outputs of machine learning modules 223-224 are sent to database 240 via upload process 230. Application 220, and machine learning modules 223-224 may provide information for information display 270. The information displayed 270 may include trending and prediction information.

FIG. 3 is a diagram illustrating data flows to maintain machine learning functions. In FIG. 3, system 300 comprises data source 310, application 320, upload process 330, database 340, business intelligence output 345, machine learning operations 350, machine learning management 360, information display 370, and alert 327. Application 320 includes context 321, data collection 322, machine learning module/function X 323, machine learning module/function Y 324, drift detector 325, and alert 326.

In FIG. 3, data source 310 is operatively coupled to application 320. Application 320 is operatively coupled to upload process 330. Upload process 330 is operatively coupled to database 340. Database 340 is operatively coupled to business intelligence output 345 and machine learning operations 350. Machine learning operations 350 is operatively coupled to machine learning management 360. Machine learning management 360 is operatively coupled to application 320. Application 320 is operatively coupled to alert 327. Alert 327 is operatively coupled to machine learning operations 350.

Application 320 receives runtime data from data source 310. Application 320 collects (using data collection 322) and applies a context to the received runtime data from data source 310. Application 320 also provides the runtime data to machine learning modules 323-324. The contextualized data and the outputs of machine learning modules 323-324 are sent to database 340 via upload process 330. Application 320, and machine learning modules 323-324 may provide information for information display 370. The information displayed 370 may include trending, prediction, and/or drift information.

Drift detector 325 receives the outputs of machine learning modules 323-324. Drift detector 325 analyzes the outputs of machine learning modules 323-324 to determine if one or more of machine learning modules 323-324 is obsolete. If one or more machine learning modules 323-324 is determined to be obsolete, drift observer generates alert 326 and alert 327. Alert 326 may be provided to the entity that produces application 320. Alert 327 is provided to machine learning operations 350. In response to alert 327, machine learning operations 350 may retrain, modify and/or generate new machine learning models 323-324 and/or application 320. Machine learning management 360 may re-deploy the new or modified application 320 and/or machine learning modules 323-324.

Figure 4:
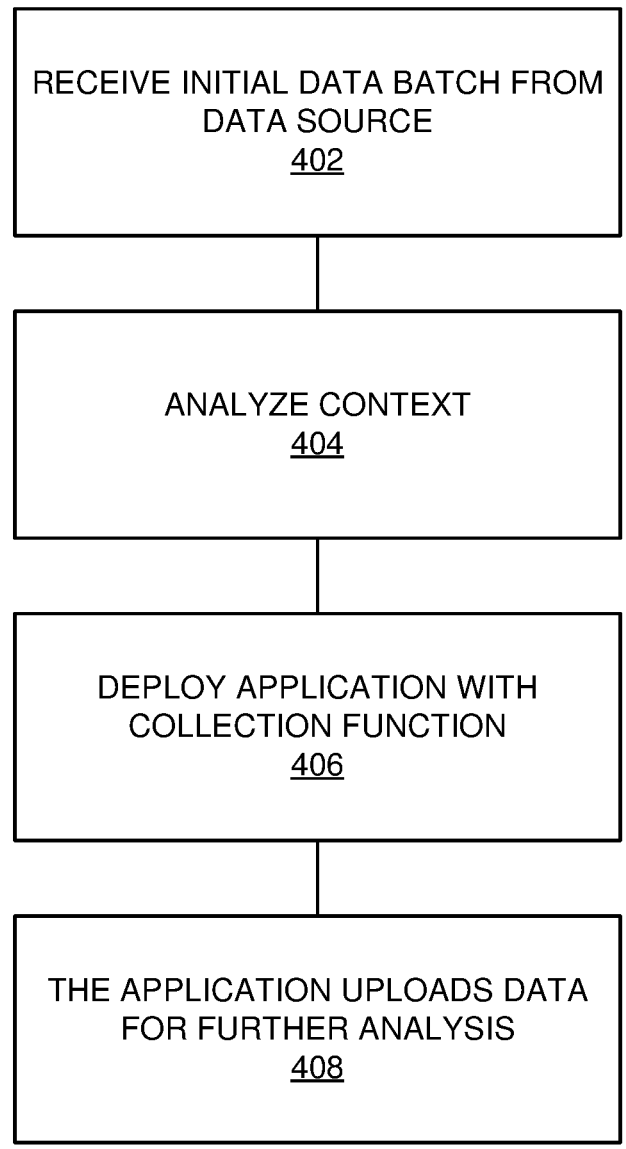
FIG. 4 is a flowchart illustrating a method of deploying a context aware function.

FIG. 4 is a flowchart illustrating a method of deploying a context aware function. One or more of the steps illustrated in FIG. 4 may be performed by, for example, system 100, system 200, system 300, and/or their components. An initial data batch is received from a data source (402). For example, database 140 and context analysis 150 may receive an initial, uncontextualized, data set from data source 110.

The context is analyzed (404). For example, based on the data batch received from data source 110, context analysis 150 may analyze and document the context of data. An application is deployed with a collection function (406). For example, encapsulation/deployment 160 may deploy application 120. Application 120 may include context 121 and collection 122 functions that were based on the analysis by context analysis 150.

The application uploads data for further analysis (408). For example, application 120 may upload contextualized data to database 140 via upload process 130. This contextualized data may be further analyzed (e.g., by machine learning operations 250.)

Figure 5:
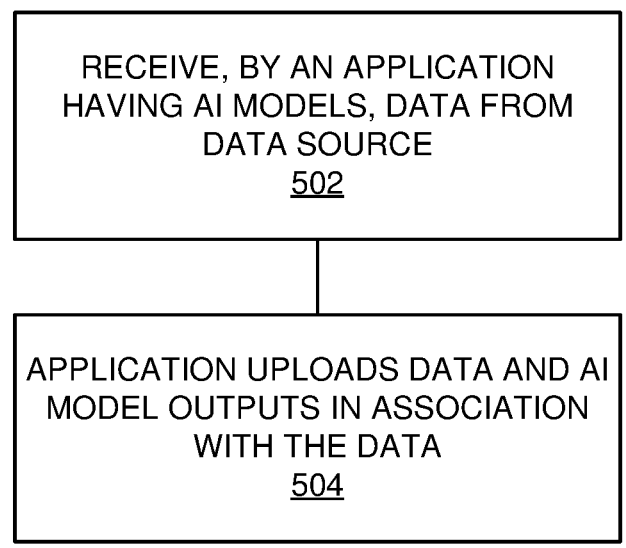
FIG. 5 is a flowchart illustrating a method of deploying a machine learning function.

FIG. 5 is a flowchart illustrating a method of deploying a machine learning function. One or more of the steps illustrated in FIG. 5 may be performed by, for example, system 100, system 200, system 300, and/or their components. By an application having artificial intelligence models, data from a data source is received (502). For example, application 220, which has machine learning modules 223-224, may collect data from data source 210.

The application uploads data and artificial intelligence model outputs in association with the data (504). For example, application 220 may upload contextualized data from data source 210 and the outputs of machine learning modules 223-224 associated with that contextualized data to database 240 via upload process 230.

Figure 6:
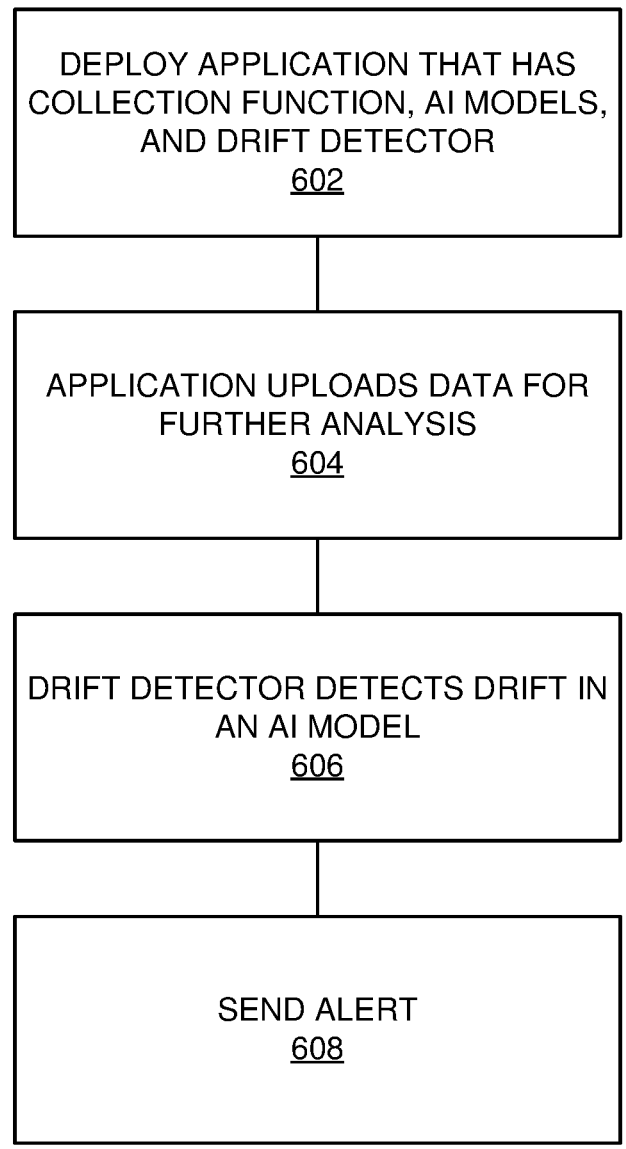
FIG. 6 is a flowchart illustrating a method of maintaining a machine learning function.

FIG. 6 is a flowchart illustrating a method of maintaining a machine learning function. One or more of the steps illustrated in FIG. 6 may be performed by, for example, system 100, system 200, system 300, and/or their components. An application is deployed that has at least one collection function, at least one artificial intelligence model, and at least one drift detector (602). For example, machine learning management 360 may deploy application 320 that includes data collection 322, machine learning modules/functions 323-324, and drift detector 325.

The application uploads data for further analysis (604). For example, application 320 may upload contextualized data to database 340 via upload process 330. This contextualized data may be further analyzed (e.g., by machine learning operations 350.) The drift detector detects drift in an artificial intelligence model (606). For example, drift detector 325 may determine that one or more of machine learning modules 323-324 is obsolete.

An alert is sent (608). For example, if one or more machine learning modules 323-324 is determined to be obsolete by drift detector 325, drift detector 325 may generate alert 326 and alert 327. Alert 326 may be provided to the entity that produces application 320. Alert 327 may be provided to machine learning operations 350.

FIG. 7 is a flowchart illustrating a method of ensuring machine learning model quality. One or more of the steps illustrated in FIG. 7 may be performed by, for example, system 100, system 200, system 300, and/or their components. A module that collects runtime data and transmits runtime data in association with a context associated to the runtime data is deployed. For example, encapsulation/deployment 160 may deploy application 120 where application 120 associates runtime data 112 with context 121 when uploading to database 140 via upload process 130.

Based on the runtime data and the context associated with the runtime data, at least one machine learning model is developed (704). For example, based on the runtime data and context information in database 240, machine learning operations 250 may develop machine learning modules 223-223 for deployment in application 220. Based on further runtime data and at least one output of the at least one machine learning model, an alert about the at least one machine learning model is generated (706). For example, based on further runtime data and at least one output of the at least one machine learning model drift detector 325 may determine one or more machine learning modules 323-324 is obsolete. Based on determining one or more machine learning modules 323-324 is obsolete, drift detector 325 may generate alert 326 and alert 327. Alert 326 may be provided to the entity that produces application 320. Alert 327 may be provided to machine learning operations 350.

Figure 8:
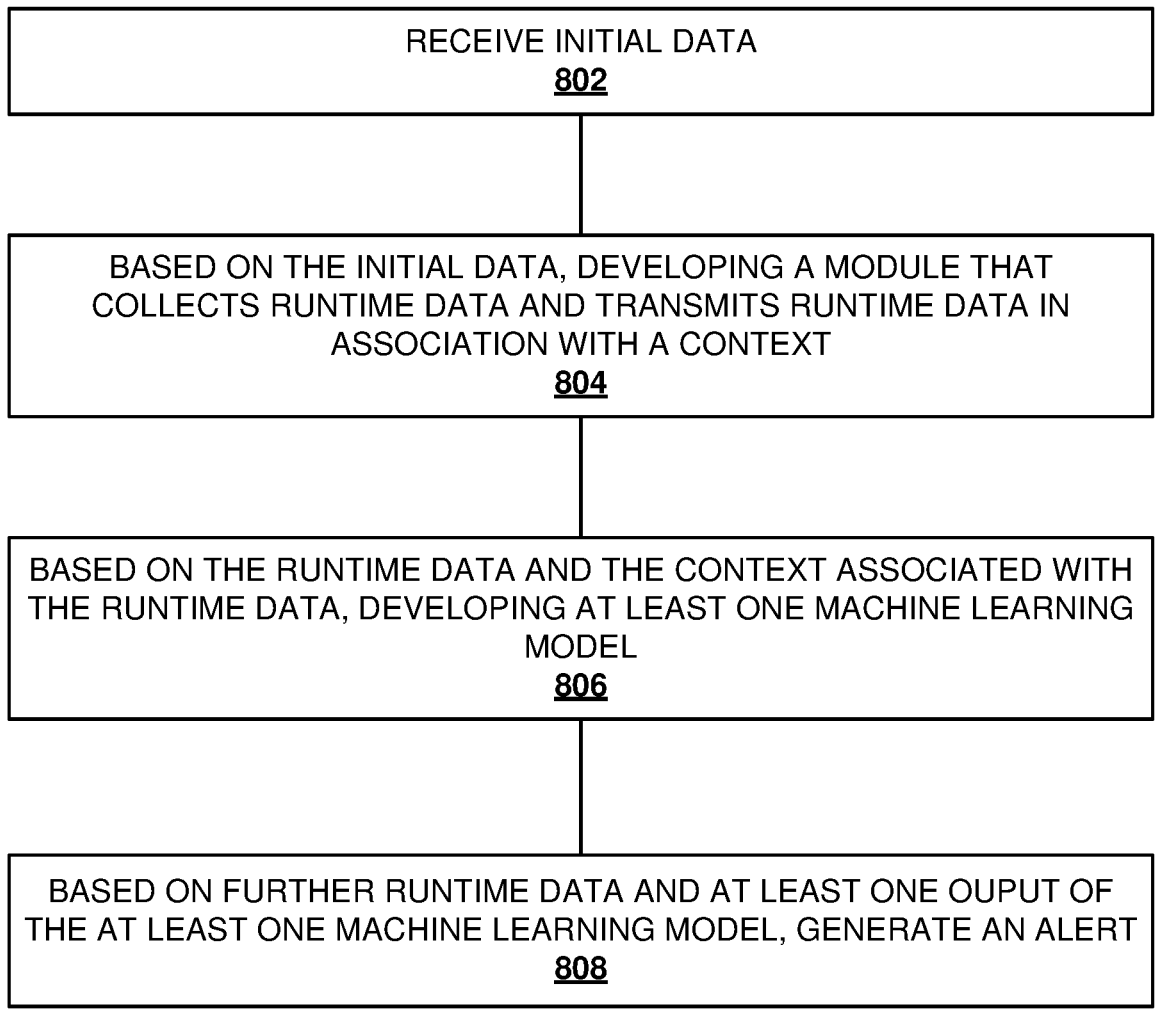
FIG. 8 is a flowchart illustrating a method of developing a machine learning model.

FIG. 8 is a flowchart illustrating a method of developing a machine learning model. One or more of the steps illustrated in FIG. 8 may be performed by, for example, system 100, system 200, system 300, and/or their components. Initial data is received (802). For example, database 140 and context analysis 150 may receive an initial, uncontextualized, data set from data source 110.

Based on the previous data, a module that collects runtime data and transmits runtime data in association with a context is developed (804). For example, context analysis 150 may develop application 120. Application 120 may include context 121 and collection 122 functions that were based on the analysis by context analysis 150. Application 120 uploads context 121 and collection 122 information to database 140 via upload process 130.

Based on the runtime data and the context associated with the runtime data, at least one machine learning model is developed (806). For example, based on the runtime data and context information in database 240, machine learning operations 250 may develop machine learning modules 223-224 for deployment in application 220. Based on further runtime data and at least one output of the at least one machine learning model, an alert about the at least one machine learning model is generated (808). For example, based on further runtime data and at least one output of the at least one machine learning model drift detector 325 may determine one or more machine learning modules 323-324 is obsolete. Based on determining one or more machine learning modules 323-324 is obsolete, drift detector 325 may generate alert 326 and alert 327. Alert 326 may be provided to the entity that produces application 320. Alert 327 may be provided to machine learning operations 350.

Figure 9:
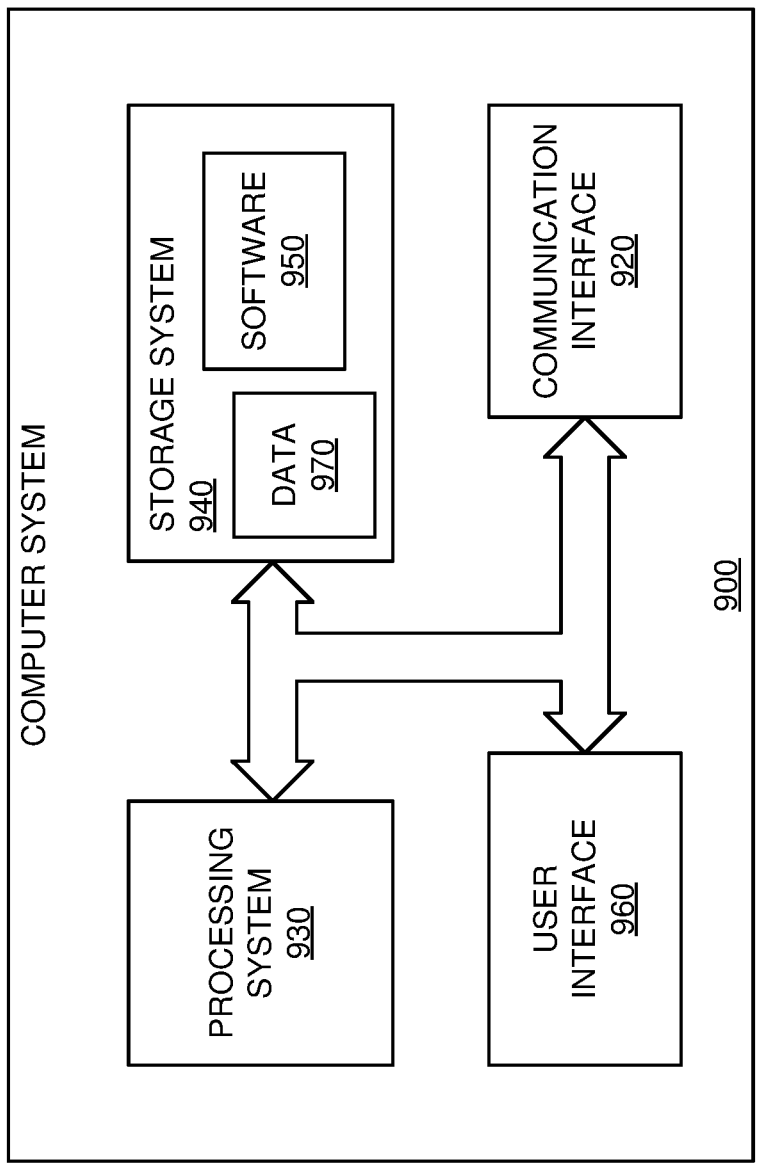
FIG. 9 is a block diagram illustrating a computer system.

FIG. 9 is a block diagram illustrating a computer system. In an embodiment, computer system 900 and/or its components include circuits, software, and/or data that implement, or are used to implement, the methods, systems and/or devices illustrated in the Figures, the corresponding discussions of the Figures, and/or are otherwise taught herein. The methods described above may also be stored on a non-transitory computer readable medium. Devices, circuits, and systems described herein may be implemented using computer-aided design tools available in the art, and embodied by computer-readable files containing software descriptions of such circuits. This includes, but is not limited to one or more elements of system 100, system 200, system 300, and/or their components. These software descriptions may be: behavioral, register transfer, logic component, transistor, and layout geometry-level descriptions.

Data formats in which such descriptions may be implemented are stored on a non-transitory computer readable medium include, but are not limited to: formats supporting behavioral languages like C, formats supporting register transfer level (RTL) languages like Verilog and VHDL, formats supporting geometry description languages (such as GDSII, GDSIII, GDSIV, CIF, and MEBES), and other suitable formats and languages. Physical files may be implemented on non-transitory machine-readable media such as: 4 mm magnetic tape, 8 mm magnetic tape, 3½-inch floppy media, CDs, DVDs, hard disk drives, solid-state disk drives, solid-state memory, flash drives, and so on.

Alternatively, or in addition, the functionally described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), multi-core processors, graphics processing units (GPUs), etc.

FIG. 9 illustrates a block diagram of an example computer system. Computer system 900 includes communication interface 920, processing system 930, storage system 940, and user interface 960. Processing system 930 is operatively coupled to storage system 940. Storage system 940 stores software 950 and data 970. Processing system 930 is operatively coupled to communication interface 920 and user interface 960. Computer system 900 may comprise a programmed general-purpose computer. Computer system 900 may include a microprocessor. Computer system 900 may comprise programmable or special purpose circuitry. Computer system 900 may be distributed among multiple devices, processors, storage, and/or interfaces that together comprise elements 920-970.

Communication interface 920 may comprise a network interface, modem, port, bus, link, transceiver, or other communication device. Communication interface 920 may be distributed among multiple communication devices. Processing system 930 may comprise a microprocessor, microcontroller, logic circuit, or other processing device. Processing system 930 may be distributed among multiple processing devices. User interface 960 may comprise a keyboard, mouse, voice recognition interface, microphone and speakers, graphical display, touch screen, or other type of user interface device. User interface 960 may be distributed among multiple interface devices. Storage system 940 may comprise a disk, tape, integrated circuit, RAM, ROM, EEPROM, flash memory, network storage, server, or other memory function. Storage system 940 may include computer readable medium. Storage system 940 may be distributed among multiple memory devices.

Processing system 930 retrieves and executes software 950 from storage system 940. Processing system 930 may retrieve and store data 970. Processing system 930 may also retrieve and store data via communication interface 920. Processing system 900 may create or modify software 950 or data 970 to achieve a tangible result. Processing system may control communication interface 920 or user interface 960 to achieve a tangible result. Processing system 930 may retrieve and execute remotely stored software via communication interface 920.

Software 950 and remotely stored software may comprise an operating system, utilities, drivers, networking software, and other software typically executed by a computer system. Software 950 may comprise an application program, applet, firmware, or other form of machine-readable processing instructions typically executed by a computer system. When executed by processing system 930, software 950 or remotely stored software may direct computer system 900 to operate as described herein.

Implementations discussed herein include, but are not limited to, the following examples:

Example 1: A method, comprising: deploying a module that collects runtime data and transmits runtime data in association with a context associated to the runtime data; based on the runtime data and the context associated with the runtime data, developing at least one machine learning model; and, based on further runtime data and at least one output of the at least one machine learning model, generating an alert about the at least one machine learning model.

Example 2: The method of claim 1, further comprising: receiving initial data; and, based on the initial data, developing the module that collects runtime data and transmits runtime data in association with the context.

Example 3: The method of claim 2, wherein the at least one machine learning model performs a data reduction function.

Example 4: The method of claim 3, wherein the at least one machine learning model performs a reactive function.

Example 5: The method of claim 3, wherein the at least one machine learning model performs a predictive function.

Example 6: The method of claim 1, wherein the alert about the at least one machine learning model is based on a first indicator that the at least one machine learning model is obsolete.

Example 7: The method of claim 6, wherein the alert about the at least one machine learning model is based on a second indicator that the at least one machine learning model has drifted.

Example 8: A method, comprising: receiving initial data; based on the initial data, developing a module that collects runtime data and transmits runtime data in association with a context; and, based on the runtime data and the context associated with the runtime data, developing at least one machine learning model.

Example 9: The method of claim 8, further comprising: based on further runtime data and at least one output of the at least one machine learning model, generating an alert about the at least one machine learning model.

Example 10: The method of claim 9, wherein the at least one machine learning model performs a data reduction function.

Example 11: The method of claim 9, wherein the at least one machine learning model performs a reactive function.

Example 12: The method of claim 9, wherein the at least one machine learning model performs a predictive function.

Example 13: The method of claim 9, wherein the alert about the at least one machine learning model is based on a first indicator that the at least one machine learning model is obsolete.

Example 14: The method of claim 13, wherein the alert about the at least one machine learning model is based on a second indicator that the at least one machine learning model has drifted.

Example 15: A non-transitory computer readable medium having instructions stored thereon that, when executed by a computer, at least instruct the computer to: receive initial data; deploy a first module that collects runtime data and transmits runtime data in association with a context, the first module to be developed based on the initial data; and, develop at least one machine learning model based on the runtime data and the context associated with the runtime data.

Example 16: The non-transitory computer readable medium of claim 15, wherein the computer is further instructed to: deploy the at least one machine learning model.

Example 17: The non-transitory computer readable medium of claim 16, wherein the computer is further instructed to: receive an alert about the at least one machine learning model that was generated based on further runtime data and at least one output of the at least one machine learning model.

Example 18: The non-transitory computer readable medium of claim 17, wherein the at least one machine learning model performs a data reduction function.

Example 19: The non-transitory computer readable medium of claim 17, wherein the at least one machine learning model performs a reactive function.

Example 20: The non-transitory computer readable medium of claim 17, wherein the at least one machine learning model performs a predictive function.

The foregoing description of the invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A method of streamlining industrial internet of things (IIOT) solutions, the method comprising:
   receiving, by a context analysis component, first runtime data from one or more data sources associated with an industrial automation process;
   analyzing, by the context analysis component, a context of the first runtime data, wherein the analyzing comprises defining the one or more data sources associated with the first runtime data and identifying data gathering processes for the one or more data sources;
   based on the analyzing the context of the first runtime data, developing, by the context analysis component, an application comprising a collection function that uses the identified data gathering processes to collect data from the one or more data sources and a context function that contextualizes the data by applying a context to the data;
   deploying, by a deployment component, the application;
   processing second runtime data with the application to generate contextualized data;

based on the contextualized data, developing, by a machine learning operations component, at least one machine learning model;

generating, by a management component, a second application implementing the at least one machine learning model in the application;

deploying, by the management component, the second application with the at least one machine learning model;

processing third runtime data with the second application to generate additional contextualized data, wherein the processing comprises generating, by the at least one machine learning model, at least one output, wherein the at least one output is generated based on the additional contextualized data;

based on the third runtime data and the at least one output of the at least one machine learning model, generating, by a detection component, a first alert and a second alert about the at least one machine learning model; and transmitting, by the detection component, the first alert to the context analysis component and the second alert to the machine learning operations component.

2. The method of claim 1, further comprising:
retraining, by the machine learning operations component and in response to the second alert, the at least one machine learning model.

3. The method of claim 2, wherein the at least one machine learning model performs a data reduction function.

4. The method of claim 3, wherein the at least one machine learning model performs a reactive function.

5. The method of claim 3, wherein the at least one machine learning model performs a predictive function.

6. The method of claim 1, wherein the first alert and the second alert are based on a first indicator that the at least one machine learning model is obsolete.

7. The method of claim 6, wherein the first alert and the second alert are based on a second indicator that the at least one machine learning model has drifted.

8. A method of streamlining industrial internet of things (IIOT) solutions, the method comprising:
receiving, by a context analysis component, first runtime data from one or more data sources associated with an industrial automation process;

analyzing, by the context analysis component, a context of the first runtime data, wherein the analyzing comprises defining the one or more data sources associated with the first runtime data and identifying data gathering processes for the one or more data sources;

based on the analyzing the context of the first runtime data, developing, by the context analysis component, an application comprising a collection function that uses the identified data gathering processes to collect data from the data source and a context function that contextualizes the data by applying a context to the data;

deploying, by a deployment component, the application;
processing, by the deployment component, second runtime data with the application to generate contextualized data;

based on the contextualized data, developing, by a machine learning operations component, at least one machine learning model;

generating, by a management component, a second application implementing the at least one machine learning model in the application;

deploying, by the management component, the second application with the at least one machine learning model;

generating, by a detection component and based on at least one output of the at least one machine learning model, a first alert and a second alert about the at least one machine learning model; and transmitting, by the detection component, the first alert to the context analysis component and the second alert to the machine learning operations component.

9. The method of claim 8, further comprising:
retraining, by the machine learning operations component and in response to the second alert, the at least one machine learning model.

10. The method of claim 9, wherein the at least one machine learning model performs a data reduction function.

11. The method of claim 9, wherein the at least one machine learning model performs a reactive function.

12. The method of claim 9, wherein the at least one machine learning model performs a predictive function.

13. The method of claim 9, wherein the first alert and the second alert are based on a first indicator that the at least one machine learning model is obsolete.

14. The method of claim 13, wherein the first alert and the second alert are based on a second indicator that the at least one machine learning model has drifted.

15. A non-transitory computer readable medium having instructions stored thereon that, when executed by a computer, at least instruct the computer to:
receive, by a context analysis component, first runtime data from one or more data sources associated with an industrial automation process;

analyze, by the context analysis component, a context of the first runtime data, wherein the analyzing comprises defining the one or more data sources associated with the first runtime data and identifying data gathering processes for the one or more data sources;

based on the analyzing the context of the first runtime data, develop, by the context analysis component, an application comprising a collection function that utilizes the identified data gathering processes to collect data from the one or more data sources and a context function that contextualizes the data by applying a context to the data;

deploy, by a deployment component, the application;
process second runtime data with the application to generate contextualized data;

develop, by a machine learning operations component, at least one machine learning model based on the contextualized data;

generate, by a management component, a second application implementing the at least one machine learning model in the application;

generate, by a detection component and based on at least one output of the at least one machine learning model, a first alert and a second alert about the at least one machine learning model; and transmit, by the detection component, the first alert to the context analysis component and the second alert to the machine learning operations component.

16. The non-transitory computer readable medium of claim 15, wherein the computer is further instructed to:
deploy, by the management component, the second application with the at least one machine learning model.

17. The non-transitory computer readable medium of claim 16, wherein the computer is further instructed to:

retrain, by the machine learning operations component and in response to the second alert, the at least one machine learning model.

18. The non-transitory computer readable medium of claim 17, wherein the at least one machine learning model performs a data reduction function.

19. The non-transitory computer readable medium of claim 17, wherein the at least one machine learning model performs a reactive function.

20. The non-transitory computer readable medium of claim 17, wherein the at least one machine learning model performs a predictive function.

\* \* \* \* \*